United States Patent
Feinberg

(10) Patent No.: US 6,935,226 B2
(45) Date of Patent: Aug. 30, 2005

(54) DISPOSABLE BARBEQUE SMOKING BOX WITH INTEGRATED SOAKING DEVICE

(76) Inventor: Andrew Feinberg, 4855 N. Mesa St., Suite 120, El Paso, TX (US) 79912-5939

( * ) Notice: Subject to any disclaimer, the term of this patent is extended or adjusted under 35 U.S.C. 154(b) by 122 days.

(21) Appl. No.: 10/698,362

(22) Filed: Nov. 3, 2003

(65) Prior Publication Data

US 2005/0092191 A1 May 5, 2005

(51) Int. Cl.[7] .............................. A23L 1/01; A23B 4/04
(52) U.S. Cl. ........................... 99/482; 99/473; 426/315; 126/595
(58) Field of Search .......................... 99/482, 480, 467, 99/473; 126/59.5, 79, 25 R; 426/312, 314, 315; 206/525, 524.6; 110/108, 118, 102; 131/329, 330, 185; 44/530, 532, 590, 606

(56) References Cited

U.S. PATENT DOCUMENTS

| 2,967,023 | A | * | 1/1961 | Huckabee ..................... 239/60 |
| D283,588 | S | | 4/1986 | Stuckey |
| 6,029,567 | A | * | 2/2000 | Tirkkonen ..................... 99/482 |
| 6,059,849 | A | | 5/2000 | Lewis |
| 6,481,344 | B1 | | 11/2002 | Green et al. |
| 6,701,829 | B2 | * | 3/2004 | Farrow ........................ 99/482 |

* cited by examiner

*Primary Examiner*—Reginald L. Alexander
(74) *Attorney, Agent, or Firm*—Connolly Bove Lodge & Hutz LLP

(57) ABSTRACT

A barbeque smoking box includes a metal container that encloses woodchips. Within the mass of the woodchips is located a frangible liquid container that ruptures when subjected to the heat of a barbeque grill. The liquid then permeates and soaks the woodchips in the frangible container. As the barbeque grill continues to heat the soaked woodchips, smoke is generated and passes in an continuous control manner through a number of small openings formed in the external package so as to smoke food that is being prepared in the grill.

12 Claims, 3 Drawing Sheets

DISPOSABLE BARBEQUE SMOKING BOX WITH INTEGRATED SOAKING DEVICE

FIELD OF THE INVENTION

The present invention relates to barbeque smoking boxes and more particularly to a disposable type having an integral frangible device which soaks contained woodchips when heated.

BACKGROUND OF THE INVENTION

The prior art contains a number of different types of barbeque smoking devices that contain organic material such as woodchips. A traditional type of smoking box includes a cast iron container portion covered by a perforated removable lid. The construction for such a smoking box is shown in U.S. Design Patent Des. 283,588. The lid is removable to fill the holder with woodchips that have been pre-soaked. The smoking box is placed upon the charcoal material of a charcoal barbeque. It may also be used in a gas barbeque by placing the smoking box under the food grate, if there is sufficient room, or on top of the food grate if there is insufficient room. The device may also be used with an electric barbeque.

The purpose of the smoking box is to allow pre-soaked woodchips to create smoke within an enclosed barbeque for flavoring the food being cooked.

The prior art includes two types of disposable vented containers that contain woodchips in order to allow food on a barbeque grill to undergo smoking. The first type is a disposable container that contains pre-soaked woodchips such as disclosed in U.S. Pat. No. 6,059,849. The disadvantage of this approach is that the wooden chips have a tendency to become waterlogged, thereby presenting more difficulties in obtaining a sufficient amount of smoke within a short period of time. Further, since the woodchips represent organic matter, it may be necessary to treat the contents of the can so that mold does not develop.

A second approach is to include dry organic material in a container that is vented by means of holes or a valve. Heating causes pressurization of small pieces of the organic material that permits smoke to be generated for flavoring food being cooked in a barbeque grill. This is the approach adopted in U.S. Pat. No. 6,481,344. This mentioned patent also includes the possibility of enclosing flavor capsules that include flavor material in some water, the water vaporizing upon heating thereby permitting spices to intermingle with the flavored smoke. The capsules are not meant to pre-soak the wood, only to create water vapor for flavored spices in the capsules. As a result, the organic material remains dry and is subject to burning, or a higher degree of smoke generation than would be desired.

BRIEF DESCRIPTION OF THE PRESENT INVENTION

The present invention includes enclosed woodchips in proximity to an enclosed frangible container of water or other liquid. Such a frangible container may take the form of a small water filled balloon or capsule.

When being subjected to the heat of a barbeque grill, the frangible water container ruptures and releases its liquid content that soaks the woodchips within the smoking box. This occurs at a fairly early stage of heating so that the woodchips have some time to become soaked with the liquid. When the soaked woodchips undergo continued heating at elevated temperatures, they begin to slowly develop a continuous stream of smoke that will flavor the food being cooked in the barbeque grill.

After the food is cooked, the disposable smoking box maybe removed and cooled. When this occurs, it may be disposed of without cleanup.

A system and method according to the present invention, will now be described, by way of example, with reference to the accompanying drawing.

DETAILED DESCRIPTION OF THE INVENTION

Figure 1:
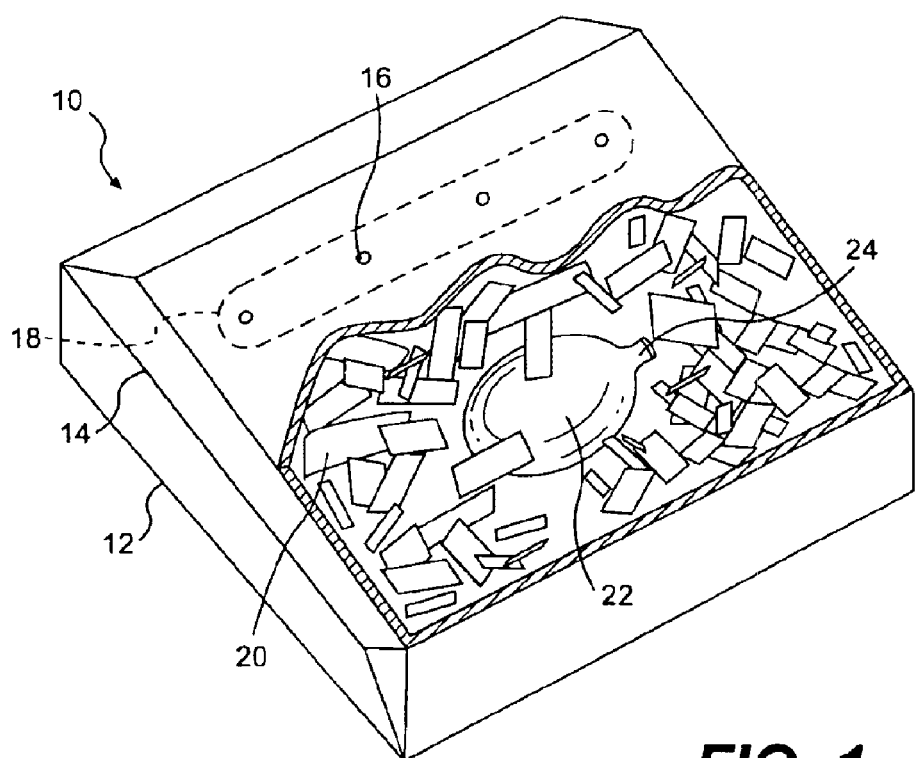
FIG. 1 is a breakaway perspective view of a foil package containing woodchips and a frangible liquid container representing a first embodiment of the present invention.

In FIG. 1, a first embodiment of the present invention is illustrated and is represented generally by reference numeral (10). The enclosure of the smoking box is a foil package (12) that may include a gusset (14). Otherwise, it can resemble a plain pouch having sealed edges. The construction of such a foil package is conventional.

Within the container is organic matter which is capable of generating smoke when sufficiently heated. In a preferred embodiment, the organic material is in the form of woodchips (20) that may not be uniform in size. Different types of wood may be used as is well known in the barbequing art.

In order to allow smoke to escape, a number of vent holes (16) are included on the top side of the packet, the holes normally being closed, during shipping, by a removable tape strip (18).

In a prototype of the present invention, an aluminium package having the approximate dimensions 5"×6"×1" and hickory wood ranging from toothpick size to approximately 1"×½" filed the package.

In order to soak the wood prior to smoking, a frangible liquid container (22) is enclosed within the foil container (12) and is preferably positioned in a central location within the package. In a prototype of the present invention, a small balloon was employed containing two ounces of water. The balloon may be easily filled through the neck (24) and appropriately tied off. Several balloons may be used.

In operation of the device, the smoking box may be positioned over hot charcoal if that type of a barbeque grill is employed. In the case of gas grills, they are usually of two types, namely (1) using ceramic briquettes; or (2) including deflection plates over gas burners. In the case of a barbeque grill using ceramic briquettes, the smoking box may be positioned on the briquettes. In the case of the gas grill type employing deflection plates above a gas burner, the smoking box may be placed on the normal food grate. It may also be used with an electric barbeque grill.

The disposable smoking box may be positioned in the barbeque grill when it is lit. As the grill heats up, the temperature will be reached where the frangible water container (22) ruptures and the liquid contents soak the organic material within the package, such as woodchips. As the heat increases, a point is reached where the organic material begins to generate smoke that is vented through the holes 16 into the enclosure of the barbeque grill so that the food being prepared may be subjected to continuous smoke for flavoring.

The organic material within the smoking box may be of many types of woods, such as cherry, apple, pecan, peach, orange, black walnut, sassafras, sugar maple, mulberry, mesquite wood or maple, oak, hickory, or pear wood. Additionally, woods flavored with other materials such as whiskey, hot peppers, hot sauces may be used. In addition to wood, additional organic materials may be included such as: herbs, spices, leaves, and other plant matter.

Further, the liquid contained within the liquid container is water in a preferred embodiment. However, additional flavoring agents may be added such as spices.

Figure 2:
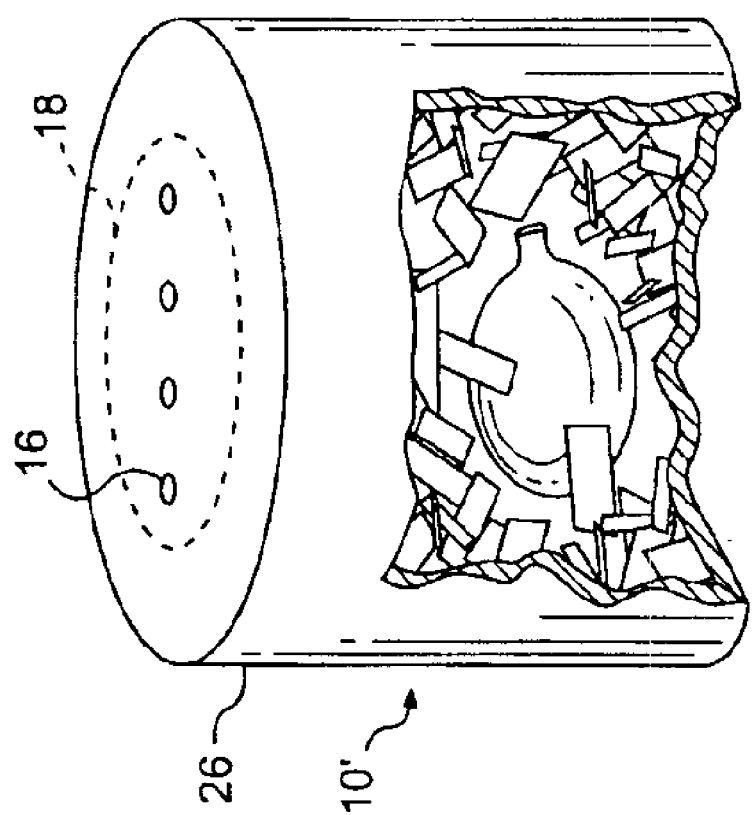
FIG. 2 is a cut-away perspective view of a smoking box in the form of a can that houses the same contents as shown in FIG. 1.

FIG. 2 shows a second embodiment of the present invention wherein the smoking box 10' has an outer container in the form of an aluminium can 26. The can may be the size of a regular "tuna fish" can that has vent holes 16 covered by a tape 18. The number of holes 16 in both embodiments of FIGS. 1 and 2 must be chosen and sized to be small enough to allow a continuous stream of smoke to permeate the food being prepared in a barbeque grill without causing smoke to pour out of the barbeque grill during cooking. The interior of the can 26 includes the same contents such as woodchips 20 and the liquid container 22 as shown in FIG. 1.

Figure 3:
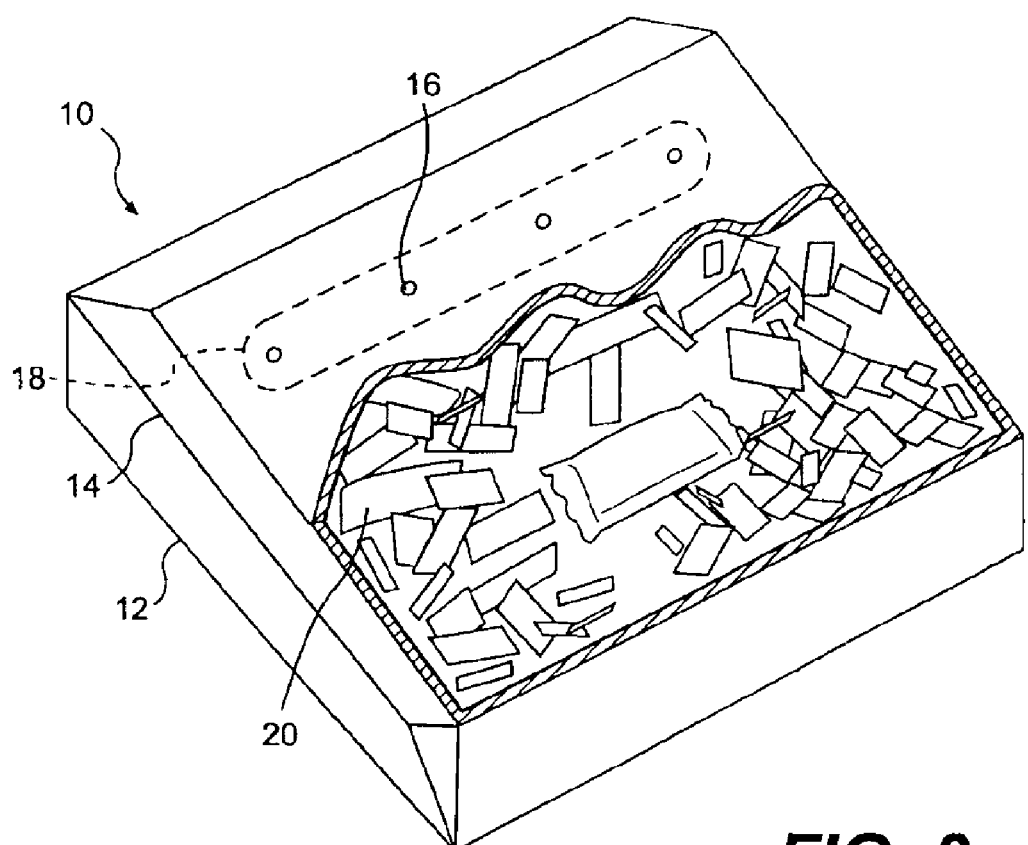
FIG. 3 is a perspective cutaway view similar to FIG. 1 showing a different type of water container within the smoking box.

FIG. 3 illustrates similar external packaging to that of FIG. 1 but instead of employing a balloon like frangible liquid container, a foil packet is employed. Such a packet would take the same form as conventional soy sauce containers well known in the packaging art. It is also noteworthy that such an aluminium frangible packet can also be employed in the can container in FIG. 2. Several such packets may be used.

The balloon or foil packet could also be replaced by a large capsule, or a number of smaller capsules filled with liquid in sufficient quantity to soak the organic material.

Utilization of a frangible liquid container that bursts when subjected to the heat of a barbeque grill, and soaks organic material such as woodchips, lends itself nicely to a host of different types of external packages that are well known in the art.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A device for smoking foods and comprising:

an outer disposable container;

vent holes formed in the container through which smoke can pass;

organic material enclosed within the container for generating smoke when subjected to sufficient heat for a predetermined period of time; and frangible inner container means for storing a preselected quantity of liquid adequate to soak the organic material prior to its generating smoke, the inner container rupturing when subjected to sufficient heat causing excessive internal pressurization therein.

2. The device as set forth in claim 1, wherein the outer container is made of metal foil.

3. The device as set forth in claim 1, wherein the organic material includes wood chips.

4. The device as set forth in claim 1, wherein the vent holes are covered by removable tape prior to use.

5. The device as set forth in claim 1, wherein the liquid is water.

6. The device as set forth in claim 1, wherein the frangible inner container is an elastic balloon.

7. The device as set forth in claim 1, wherein the frangible inner container is a sealed packet.

8. The device as set forth in claim 1, wherein the frangible inner container is a capsule.

9. The device as set forth in claim 1, wherein the outer container is a metal can.

10. A method of smoking food comprising:

enclosing organic material within an outer container;

subjecting the container to sufficient heat for a predetermined period of time;

enclosing, with in the outer container, a frangible inner container for storing a preselected quantity of liquid adequate to soak the organic material prior to its generating smoke;

causing the inner container to rupture when subjected to sufficient heat that results in excessive internal pressurization in the inner container;

subjecting the organic material to become soaked after the inner container ruptures;

generating smoke when the temperature of the contained organic material reaches a predetermined temperature; and exposing vent holes in the container through which smoke can pass.

11. The method as set forth in claim 9, wherein the organic material is formed of wood chips.

12. The method as set forth in claim 9, wherein the fluid is water.

* * * * *